United States Patent
Farley et al.

(10) Patent No.: US 10,860,541 B2
(45) Date of Patent: Dec. 8, 2020

(54) FIRE DETECTION SYSTEM WITH DISTRIBUTED FILE SYSTEM

(71) Applicant: Johnson Controls Fire Protection LP, Boca Raton, FL (US)

(72) Inventors: Robert W. Farley, Ashburnham, MA (US); James Ogier, Shirley, MA (US); Shachak Zaarur, Brookline, MA (US)

(73) Assignee: Johnson Controls Fire Protection LP, Boca Raton, FL (US)

(*) Notice: Subject to any disclaimer, the term of this patent is extended or adjusted under 35 U.S.C. 154(b) by 918 days.

(21) Appl. No.: 15/095,691

(22) Filed: Apr. 11, 2016

(65) Prior Publication Data

US 2017/0293630 A1 Oct. 12, 2017

(51) Int. Cl.
*G06F 16/178* (2019.01)
*G06F 8/654* (2018.01)
(Continued)

(52) U.S. Cl.
CPC ............ *G06F 16/178* (2019.01); *G06F 8/654* (2018.02); *G06F 16/122* (2019.01); *G06F 16/16* (2019.01);
(Continued)

(58) Field of Classification Search
CPC .... G06F 16/178; G06F 8/654; G06F 16/1844; G06F 16/122; G06F 16/16; G06F 16/1727; G06F 11/1433; G06F 21/50; G08B 17/06; G08B 25/016; H04M 11/04; H04M 2242/04; H04W 4/90; H04W 76/50
See application file for complete search history.

(56) References Cited

U.S. PATENT DOCUMENTS 5,521,588 A 5/1996 Kuehner et al.
6,034,960 A 3/2000 Beshai et al.
(Continued)

FOREIGN PATENT DOCUMENTS

DE 102 40 832 A1 3/2004
JP 2015007963 1/2015
(Continued)

OTHER PUBLICATIONS

International Preliminary Report of Patentability of the International Searching Authority, dated Oct. 25, 2018, from International Application No. PCT/IB2017/052095, filed on Apr. 11, 2017. 9 pages.

(Continued)

*Primary Examiner* — Jesse P Frumkin
(74) *Attorney, Agent, or Firm* — HoustonHogle LLP

(57) ABSTRACT

A distributed file system for a vehicle fire system leverages unused memory in slave modules. Such a system comprises file metadata stored on the master module, which includes information about specific files and the location of used and unused memory throughout the system, including memory on the master module and installed slave units. By maintaining the file metadata and sending instructions to slave units to save or read files at certain addresses, the master module can avail itself of unused memory throughout the entire system. This allows the master module to store more information on the system than there is available memory on the master itself.

24 Claims, 15 Drawing Sheets

(51) Int. Cl.
  *G06F 16/16* (2019.01)
  *G06F 16/11* (2019.01)
  *G06F 16/17* (2019.01)
  *G06F 16/182* (2019.01)
  *G08B 17/06* (2006.01)

(52) U.S. Cl.
  CPC ........ *G06F 16/1727* (2019.01); *G06F 16/182* (2019.01); *G06F 16/1844* (2019.01); *G08B 17/06* (2013.01)

(56) References Cited

U.S. PATENT DOCUMENTS

| | | | |
|---|---|---|---|
| 6,170,044 B1* | 1/2001 | McLaughlin | G05B 9/03 711/112 |
| 6,751,682 B1 | 6/2004 | Stirling | |
| 6,892,256 B1 | 5/2005 | Krishnankutty | |
| 8,232,869 B2 | 7/2012 | Bennett | |
| 8,972,345 B1 | 3/2015 | Aguilera | |
| 9,053,124 B1 | 6/2015 | Dornquast et al. | |
| 10,453,320 B2* | 10/2019 | Farley | H04L 61/2038 |
| 2002/0129216 A1 | 9/2002 | Collins | |
| 2003/0145130 A1* | 7/2003 | Schultz | G06F 8/65 719/325 |
| 2005/0005049 A1 | 1/2005 | Montalvo et al. | |
| 2005/0251673 A1 | 11/2005 | Bosley et al. | |
| 2006/0206634 A1 | 9/2006 | Torisaki et al. | |
| 2006/0224048 A1 | 10/2006 | Devaul et al. | |
| 2007/0021844 A1 | 1/2007 | Kuhls et al. | |
| 2007/0174686 A1* | 7/2007 | Douglas | G06F 11/2097 714/13 |
| 2008/0082589 A1* | 4/2008 | English | G06F 16/119 |
| 2008/0189349 A1 | 8/2008 | Krig | |
| 2008/0263181 A1 | 10/2008 | Nagata | |
| 2009/0249325 A1 | 10/2009 | Wontorcik et al. | |
| 2010/0138576 A1 | 6/2010 | Goerlich et al. | |
| 2010/0176931 A1 | 7/2010 | Bennett | |
| 2011/0035741 A1 | 2/2011 | Thiyagarajan | |
| 2012/0015642 A1* | 1/2012 | Seo | G06F 8/65 455/419 |
| 2012/0254116 A1 | 10/2012 | Thereska et al. | |
| 2012/0271924 A1 | 10/2012 | Spitaels et al. | |
| 2013/0322762 A1 | 12/2013 | Zeng et al. | |
| 2014/0007073 A1 | 1/2014 | Cavalaris et al. | |
| 2014/0068561 A1 | 3/2014 | Halder | |
| 2014/0317612 A1* | 10/2014 | Ayanam | G06F 11/1433 717/171 |
| 2015/0222541 A1 | 8/2015 | West et al. | |
| 2015/0310191 A1 | 10/2015 | Koval et al. | |
| 2015/0378715 A1* | 12/2015 | Solnit | G06F 8/65 713/2 |
| 2016/0117165 A1* | 4/2016 | Cavalaris | G06F 8/654 717/169 |
| 2016/0142370 A1 | 5/2016 | Linder et al. | |
| 2017/0293478 A1* | 10/2017 | Farley | G06F 8/65 |
| 2017/0293630 A1* | 10/2017 | Farley | G06F 16/182 |
| 2017/0294092 A1 | 10/2017 | Farley et al. | |
| 2020/0012488 A1* | 1/2020 | Koval | G06F 8/71 |

FOREIGN PATENT DOCUMENTS

| | | |
|---|---|---|
| WO | WO 2012097570 | 7/2012 |
| WO | WO 2014/047574 | 3/2014 |
| WO | 2014/209368 A1 | 12/2014 |
| WO | WO 2014/188682 | 2/2017 |

OTHER PUBLICATIONS

International Preliminary Report of Patentability of the International Searching Authority, dated Oct. 25, 2018, from International Application No. PCT/IB2017/052096, filed on Apr. 11, 2017. 8 pages.

International Preliminary Report of Patentability of the International Searching Authority, dated Oct. 25, 2018, from International Application No. PCT/IB2017/052098, filed on Apr. 11, 2017. 8 pages.

International Search Report and Written Opinion of the International Searching Authority, dated Jun. 21, 2017, from International Application No. PCT/IB2017/052095, filed on Apr. 11, 2017. Fourteen pages.

International Search Report and the Written Opinion of the International Searching Authority, dated Jul. 10, 2017, from International Application No. PCT/IB2017/052098, filed on Apr. 11, 2017. Thirteen pages.

International Search Report and the Written Opinion of the International Searching Authority, dated Jul. 10, 2017, from International Application No. PCT/IB2017/052096, filed on Apr. 11, 2017. Fifteen pages.

Anonymous, "Clustered file system—Wikipedia," en.wikipedia.org, Mar. 31, 2016, pp. 1-7, XP055386966. Seven pages.

Ansul Checkfire 210 Detection and Actuation Product Overview, www.ansul.com, 2014. Two pages.

Ansul Fire Protection for Mobile Forestry Equipment, www.ansul.com, 2014. Two pages.

Examination Report, dated Nov. 25, 2019, from European Patent Application No. 17 717 877.9, filed on Oct. 5, 2018. 5 pages.

Examination Report, dated Aug. 18, 2020, from European Patent Application No. 17 717 877.9, filed on Oct. 5, 2018. 5 pages.

\* cited by examiner file metadata 224 file index 260

| file type | version | location (device) | start address | size | checksum |
|---|---|---|---|---|---|
| battery | 2 | master | address1 | 120 KB | checksum1 |
| display | 5 | battery | address2 | 120 KB | checksum2 |
| fire sensor | 3 | battery | address3 | 24 KB | checksum3 |
| release | 2 | battery | address4 | 24 KB | checksum4 | device index 262

| device | total memory | free memory |
|---|---|---|
| master | 512 KB | 24 KB |
| battery | 512 KB | 12 KB |
| display | 512 KB | 174 KB |
| fire sensor | 64 KB | 32 KB |
| release | 64 KB | 32 KB |

FIG. 5 file metadata 224 file index 260

| file type | version | location (device) | start address | size | checksum |
|---|---|---|---|---|---|
| battery | 2 | master | address1 | 120 KB | checksum1 |
| display | 5 | battery | address2 | 120 KB | checksum2 |
| fire sensor | 3 | battery | address3 | 24 KB | checksum3 |
| release | 2 | battery | address4 | 24 KB | checksum4 |
| battery | 3 | display | address5 | 120 KB | checksum5 |
| fire sensor | 4 | display | address6 | 32 KB | checksum6 |
| release | 3 | display | address7 | 12 KB | checksum7 |
| | | fire sensor | address8 | 20 KB | checksum8 | device index 262

| device | total memory | free memory |
|---|---|---|
| master | 512 KB | 24 KB |
| battery | 512 KB | 12 KB |
| display | 512 KB | 10 KB |
| fire sensor | 64 KB | 12 KB |
| release | 64 KB | 32 KB |

FIG. 9

FMTERA (Erase Page)

| Format Code 0x7D |
|---|
| Page Address Byte 1 (MSB) |
| Page Address Byte 2 |
| Page Address Byte 3 |
| Page Address Byte 4 (LSB) |
| Page Erase Mask Byte 1 (MSB) |
| Page Erase Mask Byte 2 |
| Page Erase Mask Byte 3 |
| Page Erase Mask Byte 4 (LSB) |

FMTFTR (Filesystem Task Return)

| Format Code 0x71 | | | | | | | |
|---|---|---|---|---|---|---|---|
| .7 | .6 | .5 | .4 | .3 | .2 | .1 | .0 |
| .15 | .14 | .13 | .12 | .11 | .10 | .9 | .8 |

508

.0: No File Found
.1: File CRC Error
.2: Flash Read Error
.3: Flash Write Error
.4: Flash Erase Error
.5: Filesystem Full Error
.6: Metadata Flash Erase Error
.7: Metadata Flash Write Error
.8: Metadata CRC Error
.9: Version Invalid Error
.10: Filesystem Busy
.11-15: Unused

FIG. 11 file metadata 224 file index 260

| file type | version | location (device) | start address | size | checksum |
|---|---|---|---|---|---|
| display | 5 | battery | address2 | 120 KB | checksum2 |
| battery | 3 | display | address5 | 120 KB | checksum5 |
| fire sensor | 4 | display | address6 | 32 KB | checksum6 |
| | | display | address7 | 12 KB | checksum7 |
| release | 3 | fire sensor | address8 | 20 KB | checksum8 |
| ... | | | | | | device index 262

| device | total flash memory | free flash memory |
|---|---|---|
| master | 512 KB | 144 KB |
| battery | 512 KB | 60 KB |
| display | 512 KB | 10 KB |
| fire sensor | 64 KB | 12 KB |
| release | 64 KB | 32 KB |

FIG. 13

FMTECR (External Checksum Reply)

| Format Code 0x7E |
| Checksum Calculation Status |
| Start Page Address Byte 1 (MSB) |
| Start Page Address Byte 2 |
| Start Page Address Byte 3 |
| Start Page Address Byte 4 (LSB) |

FMTECG (External Checksum Get)

| Format Code 0x7F |
| Restart/Start computation with this information |
| Start Page Address Byte 1 (MSB) |
| Start Page Address Byte 2 |
| Start Page Address Byte 3 |
| Start Page Address Byte 4 (LSB) |
| Stop Page Address Byte 1 (MSB) |
| Stop Page Address Byte 2 |
| Stop Page Address Byte 3 |
| Stop Page Address Byte 4 (LSB) |

FMTRDM (Read Slave Memory Location)

| Format Code 0xc1 |
| --- |
| High Byte of MSW of Start Address |
| Low Byte of MSW of Start Address |
| High Byte of LSW of Start Address |
| Low Byte of LSW of Start Address |
| Number of bytes to Read (0-128) |

FMTMEM (Memory Data Response)

| Format Code 0xc3 |
| --- |
| Number of bytes |
| Data at specified start address |
| ⋮ |
| Last byte of data |

516

FIG. 18

FIRE DETECTION SYSTEM WITH DISTRIBUTED FILE SYSTEM

RELATED APPLICATIONS

This application is related to U.S. application Ser. No. 15/095,680, filed on Apr. 11, 2016, entitled "Fire detection system with automatic firmware updating", now U.S. Patent Publication No.: 2017/0293478 A1, and U.S. application Ser. No. 15/095,697, filed on Apr. 11, 2016, entitled "Addressing method for slave units in fire detection system", now U.S. Patent Publication No.: 2017/0294092 A1, both of which are incorporated herein by reference in their entirety.

BACKGROUND OF THE INVENTION

Fire systems, such as fire detection systems, fire suppression systems or combination fire detection and suppression systems, typically comprise a master module and a series of slave units. Slave units have elements that are designed to perform specific tasks related to fire detection, notification, and suppression, such as detecting information about the environment and communicating the information to the master module, or, upon receiving instructions from the master module, performing a fire suppression function or generating an audible and/or visual alert to occupants.

Different types of slave units or combinations of slave units are typically deployed based on the specific application. Fire systems for premises typically include fire sensors, pull stations, and alarms. On the other hand, fire systems for vehicles typically include a variety of sensors, release modules, annunciators, and manual override switches.

Fire systems are installed on large vehicles such as those used in the mining, forestry, landfill and mass transit industries to prevent or mitigate damage to complex and expensive equipment. For example, a mining dump truck could feature a reciprocating engine driving a generator, which in turn provides power to electric motors that drive the wheels. Any one of these components can overheat and catch on fire, causing extensive damage to complex and expensive equipment. The fire systems are employed to minimize such losses.

The master modules and slave units of fire systems are typically installed on a common bus. Each of these modules and units will typically include micro controllers, nonvolatile memory (for example, flash memory) and transceivers for communicating on the bus. Master modules send instructions to and receive information from slave units through their respective transceivers. Within each module or unit, the microcontrollers execute firmware instructions stored in memory. In addition to firmware, modules also store data associated with maintaining state.

SUMMARY OF THE INVENTION

As the operational lifetimes of the fire systems are often measured in decades, new versions of modules' firmware are typically released throughout the systems' lifetimes. New firmware is installed to fix bugs, improve performance, or enable compatibility with new devices.

Some systems require using portable computers or other tools to update firmware. Another approach is to enable the fire systems to read firmware updates from memory sticks via ports, e.g., universal serial bus (USB) ports, on the systems.

The microcontrollers of the master modules and slave units are typically commodity devices. These microcontrollers are general purpose controllers that are specified with fixed non-volatile memory sizes. And, microcontrollers with larger memory sizes are generally more expensive because of the concomitant larger die sizes for these microcontrollers. On the other hand, when designing these systems there is usually a need to reduce costs, so often the designer will try to select the microcontrollers with the smallest non-volatile memory sizes that will nevertheless have the capacity to store the firmware necessary for the operation of the module or unit. Nevertheless, there is usually still some unused memory in each of the master module and slave units.

According to the invention, this unused memory can be made available to the master module through the implementation of a distributed file system. Such a system comprises file metadata stored on the master module, which includes information about specific files and the location of used and unused memory throughout the system, including memory on the master module and installed slave units. By maintaining the file metadata and sending instructions to slave units to save or read files at certain addresses, the master module can avail itself of unused memory throughout the entire system. This allows the master module to store more information on the system than there is available memory on the master itself.

This distributed file system can be used to store images of the firmware for each type of slave unit installed on the system. The images can in turn be used to update the firmware of slave units in the event that their current firmware is corrupted or outdated or a new unit is installed.

In general, according to one aspect, the invention features a method for storing files in a fire system, the method comprising a master module determining available memory on slave units, the master module instructing the slave units to store new files to the available memory, and the master module reading the files stored to the slave units.

In embodiments, the master module determines the available memory by accessing metadata specifying available memory in the slave units. The system can further automatically update backup firmware images maintained by the master. Specifically, the master module compares versions of the new files to versions of files previously stored by the master module and only stores the new files if the version of the new files are more recent than the versions of the files previously stored. The metadata identifying the slave units on which the new files are stored is then updated. Older versions corresponding to the new files that were previously stored by the master module can also be deleted.

In general, according to another aspect, the invention features a system for storing files in a fire system. The system comprises slave units of the fire system and a master module determining available memory on the slave units, storing new files to the available memory, and reading the files stored to the slave units.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5 is a schematic diagram showing the file metadata;

FIG. 9 shows the file metadata of FIG. 5 after new files have been stored;

FIG. 10 illustrates the erase page instruction;

FIG. 11 illustrates the filesystem task return packet;

FIG. 13 shows the file metadata of FIG. 9 after older versions corresponding to newly stored files are deleted;

FIG. 15 illustrates the external checksum get instruction;

FIG. 16 illustrates the external checksum reply packet;

FIG. 17 illustrates the read slave memory location instruction; and

FIG. 18 illustrates the memory data response packet.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
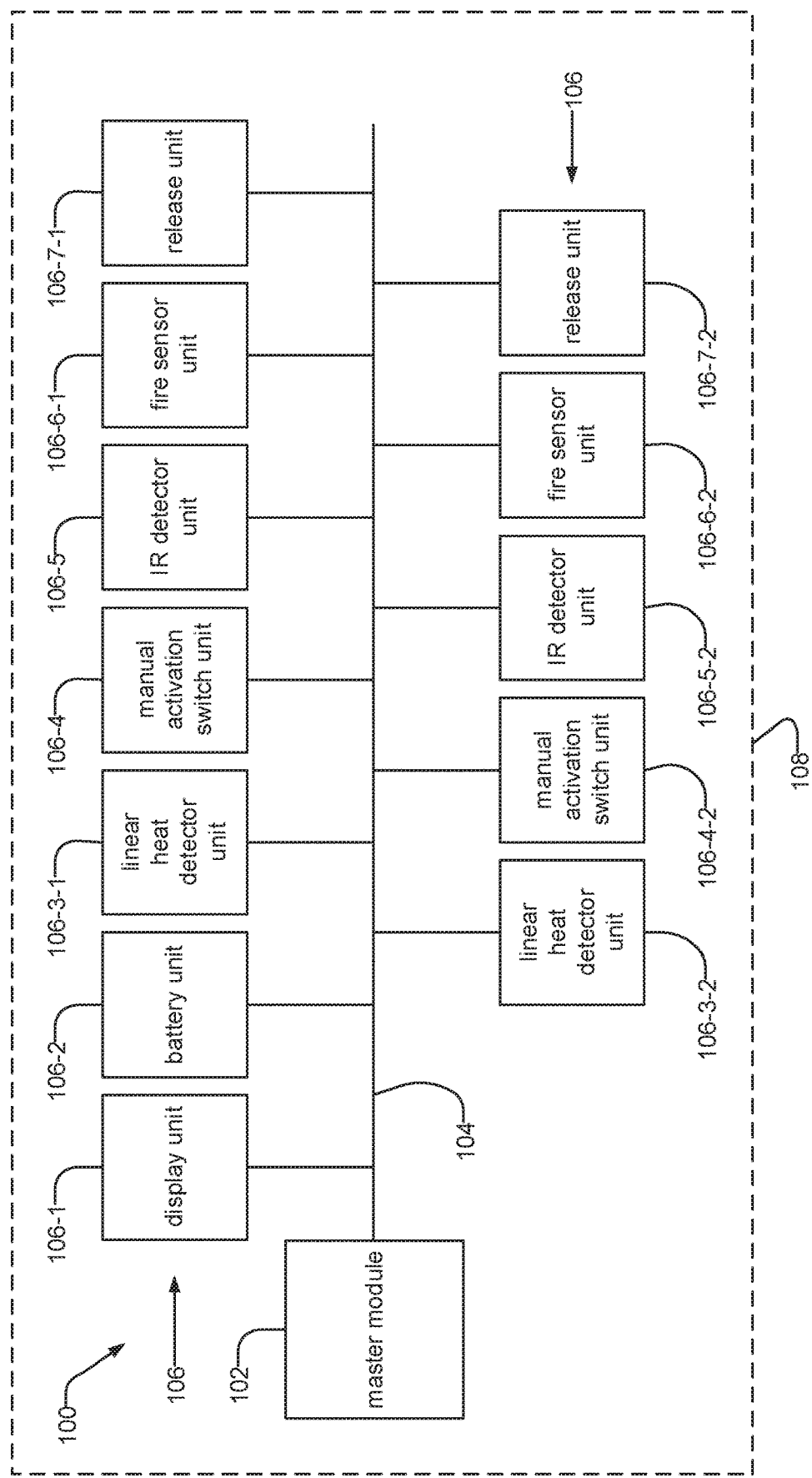
FIG. 1 is a block diagram of a fire system installed on a vehicle, for example.

FIG. 1 is a block diagram of a fire system 100, such as a fire detection system, a fire suppression system or a combination fire detection and suppression system, installed on a vehicle 108, to which the present invention is applicable.

The system 100 comprises a master module 102 and a series of slave units 106 installed on a common bus 104. The master module 102 sends instructions to and receives information from the slave units 106, and the slave units 106 receive instructions from the master module 102 and send information (for example, information about the environment detected by a slave unit 106) to the master module 102.

The data bus 104 is preferably common from a logical perspective. The master module 102 preferably uses a common address space to communicate with the various slave units 106 using the data bus 104. That said, the bus 104 is currently implemented as several physical data buses/wiring interfaces (ports) on the master module 102. This helps to ensure proper and repeatable installation by having specific units be connected to specific wiring interfaces or ports on the master module 102.

In the illustrated example, the installed slave units include a display unit 106-1, which displays information about the state of the fire system 100, a battery unit 106-2, which supplies power to the fire system 100, two linear heat detector units 106-3, which detect heat and communicate information to the master module 102, two manual activation switch units 106-4, which, when activated by an operator (for example, a driver of the vehicle) trigger a fire suppression function, two IR detector units 106-5, which detect infrared radiation and communicate information to the master module 102, two fire sensor units 106-6, which detect the presence of fire and communicate information to the master module 102, and two release units 106-7, which perform a fire suppression function.

In one example, the fire sensor unit 106-6 could detect that a fire is present through the operation of its fire sensor element and send the information to the master module 102. The master module 102, in turn, could then send instructions to the release module 106-7 to perform a fire suppression function, and/or instructions to the display 106-1 to display an alert.

FIGS. 2A-2D are schematic diagrams of various units of the fire system 100. Each unit similarly includes a controller 202, 214, 228, 244, a transceiver 204, 216, 230, 246, volatile random access memory (RAM) 206, 218, 232, 248, nonvolatile memory 208, 220, 236, 252, and read only memory (ROM) 210, 222, 238, 254. Each unit 106, 102, 106-2, 106-1 connects to the common bus 104 through its transceiver 204, 216, 230, 246. The controllers 202, 214, 228, 244 execute firmware instructions stored on the nonvolatile memory 208, 220, 236, 252. In addition to firmware, the nonvolatile memory of each unit also stores data associated with maintaining state.

Figure 2A:
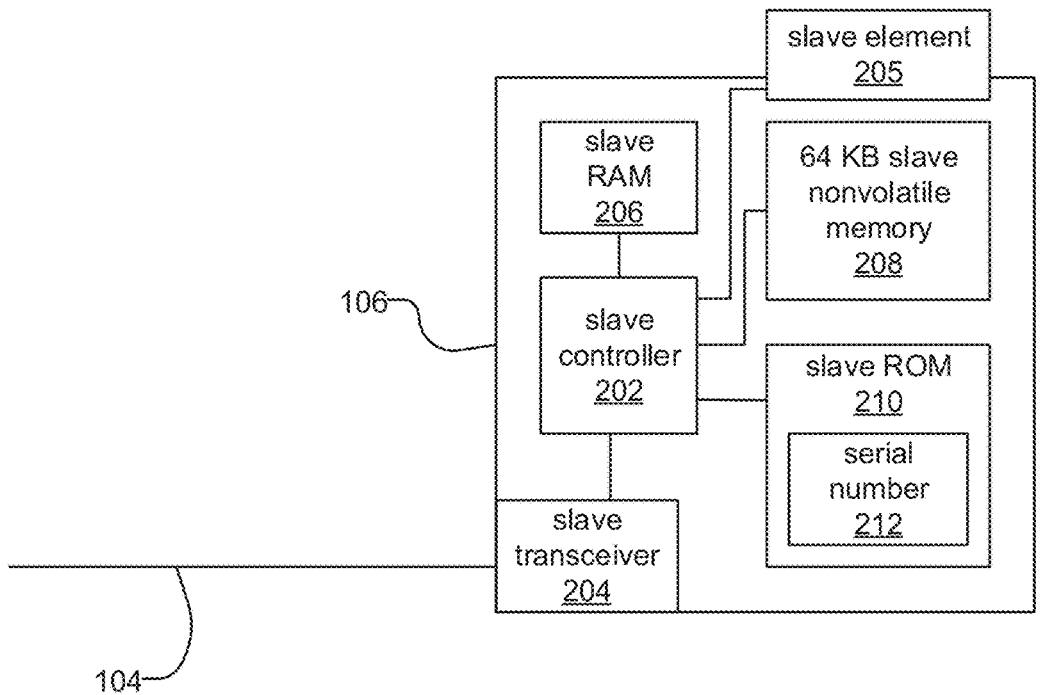
FIG. 2A is a schematic diagram of a generic slave unit.

FIG. 2A is a schematic diagram of a generic slave unit 106. Examples include fire sensor units 106-6 and release units 106-7. Each of the slave units typically includes a slave element 205, which is typically different for each type of slave. For example for a smoke detector slave unit, the slave element 205 is a smoke sensor that detects smoke, with the slave controller monitoring the detected smoke levels by the element and communicating those levels to the master module. In another example, for a fire detector slave unit, the slave element 205 might be a thermistor that detects ambient temperature with the slave controller monitoring the detected temperature levels and communicating those levels to the master module or triggering an alarm condition itself. In the case of a release unit, the slave element 205 might be a relay that controls the release of fire suppressant. The slave controller in this case waits for a release instruction from the master module 102 and then operates the relay accordingly.

Figure 2B:
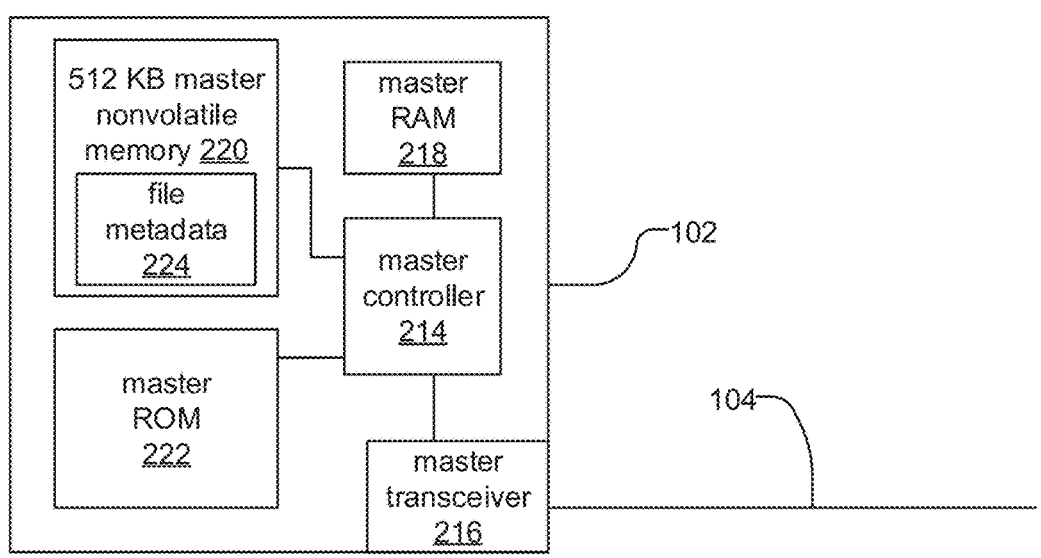
FIG. 2B is a schematic diagram of a master module.

FIG. 2B is a schematic diagram of the master module 102. In addition to firmware and data associated with maintaining state, the master nonvolatile memory 220 also stores file metadata 224.

Figure 2C:
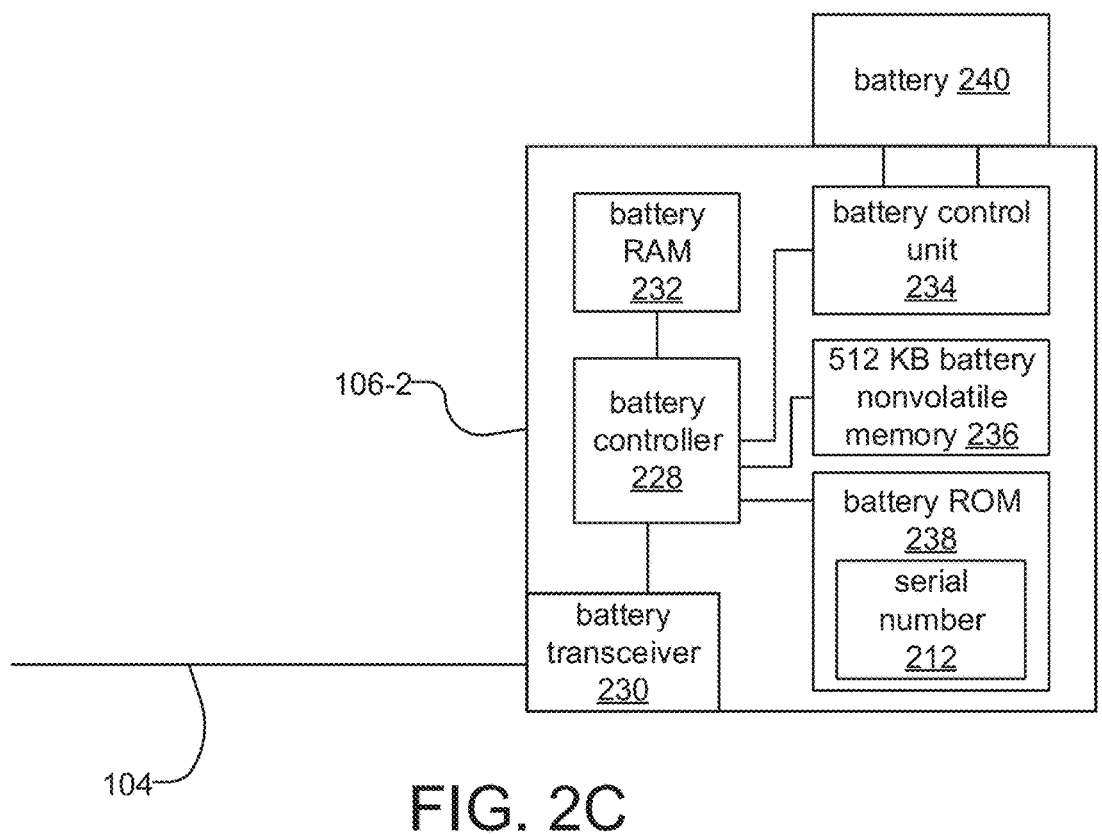
FIG. 2C is a schematic diagram of a battery unit.

FIG. 2C is a schematic diagram of a battery unit 106-2, which is a particular type of slave unit 106 that monitors the battery used to provide back-up power to the fire system 100. The battery control unit 234 performs the functions of a battery management system (e.g. preventing the battery from operating outside its Safe Operating Area, monitoring its state, etc.

Figure 2D:
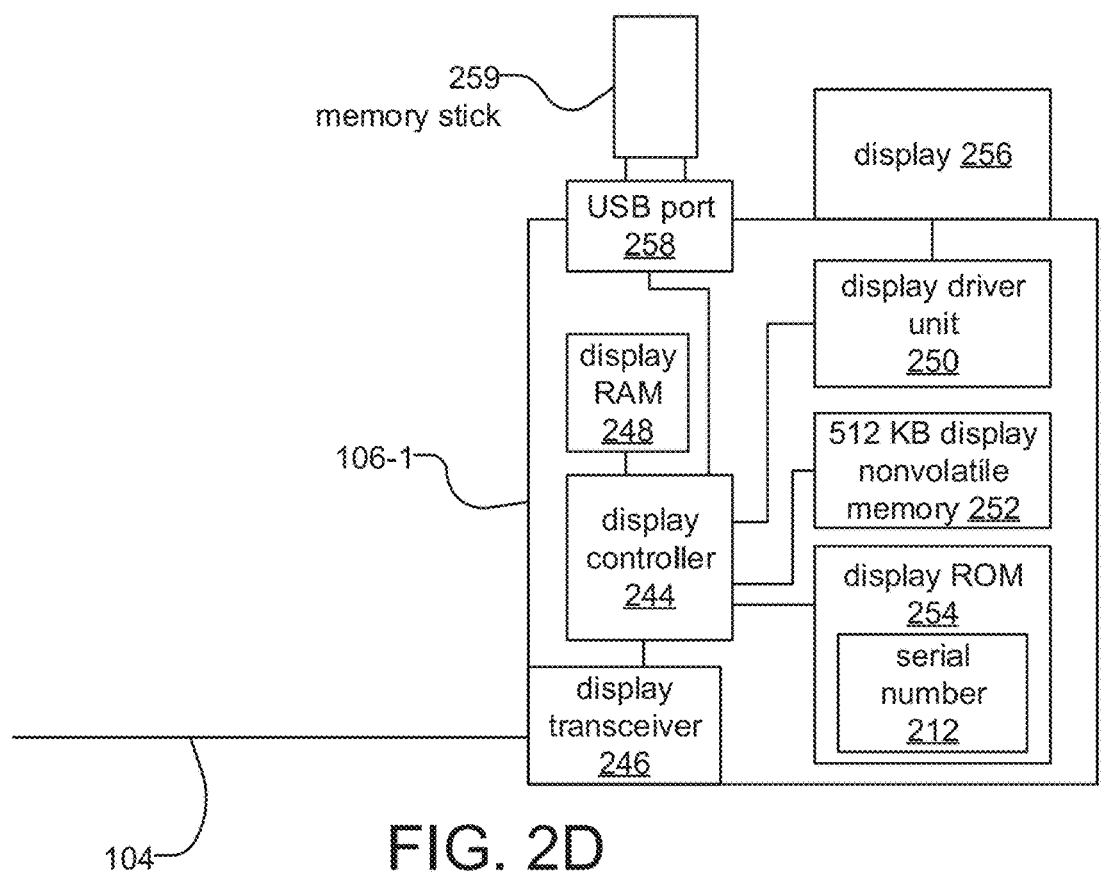
FIG. 2D is a schematic diagram of a display unit.

FIG. 2D is a schematic diagram of a display unit 106-1, which is a particular type of slave unit 106 that displays information about the state of the fire system 100. The display driver unit 250 renders information to be displayed on the display 256 to a vehicle operator, for example. The USB port 258 receives data from an external memory device or portable computer system and communicates the information to the display controller 244. The memory stick 259 is an example of external memory, and is a portable device with nonvolatile memory (for example, flash memory) and a USB port. The memory stick 259 could contain, for example, updates to slave firmware. A laptop computer using the programmer software with a USB port can also provide new files to the system.

According to the illustrated embodiment, the master module implements a distributed file system that utilizes available non-volatile memory on itself and/or slave units. In operation the master module determines available memory on the slave units and stores files, such as new files made available to the system 100, to the available memory and then later reads and otherwise maintains these files. File metadata 224 stored on the master module or otherwise accessible to the master module serves as the index for this distributed system.

Figure 3:
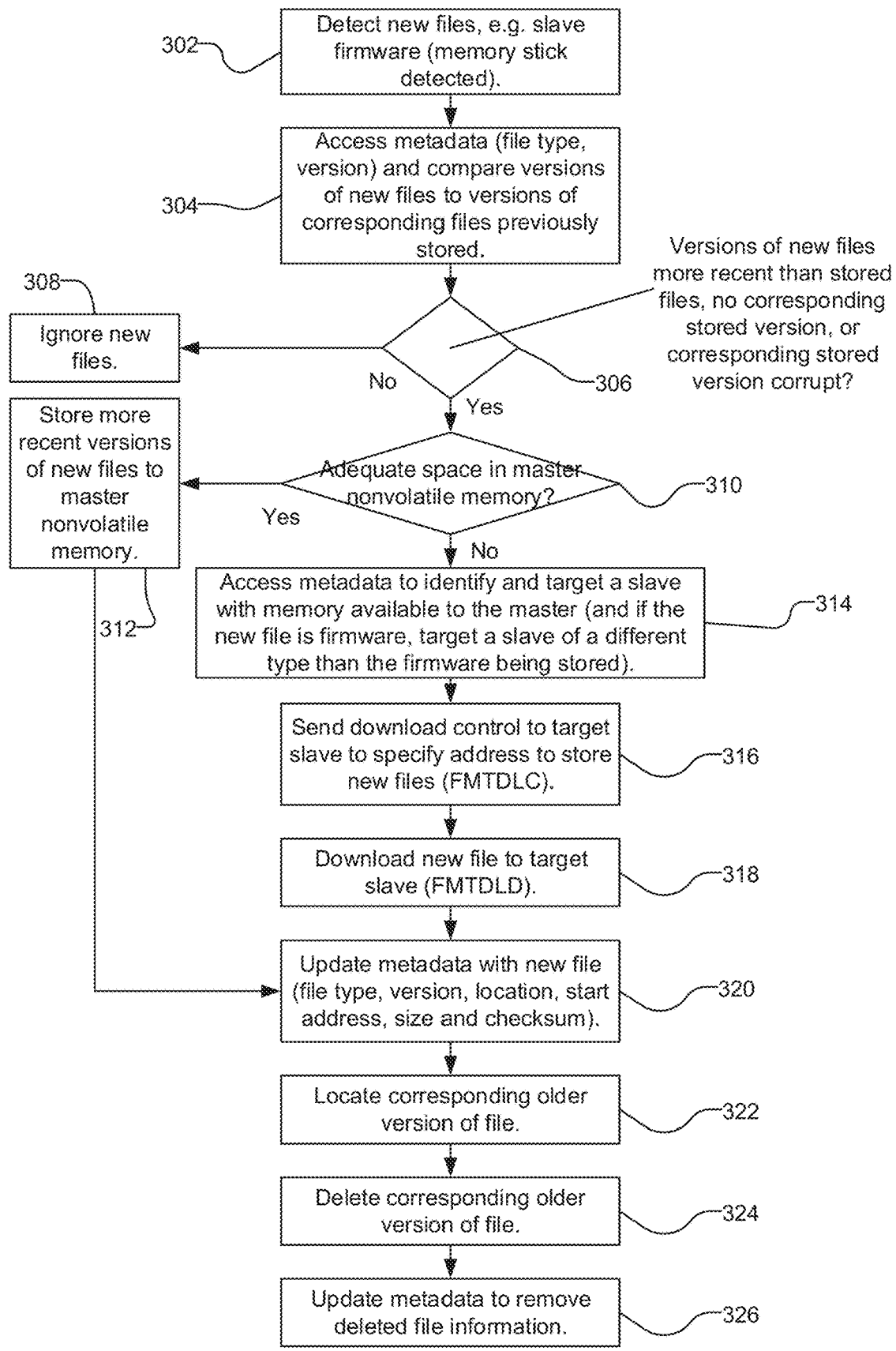
FIG. 3 is a flow diagram showing the method for distributed file storage by the master module among the slave units.

FIG. 3 is a flow diagram showing the method for storing files to the distributed file storage by the master module 102 among the slave units 106. It shows a process in which the master automatically updates older versions of slave firmware images, to illustrate one example of its operation. It should be noted, however, that other types of files could be stored to this distributed file system.

In step 302, new files are detected by the master module 102. In one example, new slave firmware files are detected on a memory stick plugged into the fire system 100. In one example, every time a memory stick is detected, the master module 102 via the display unit 106-1 reads the contents of the files stored on the memory stick.

Figure 4:
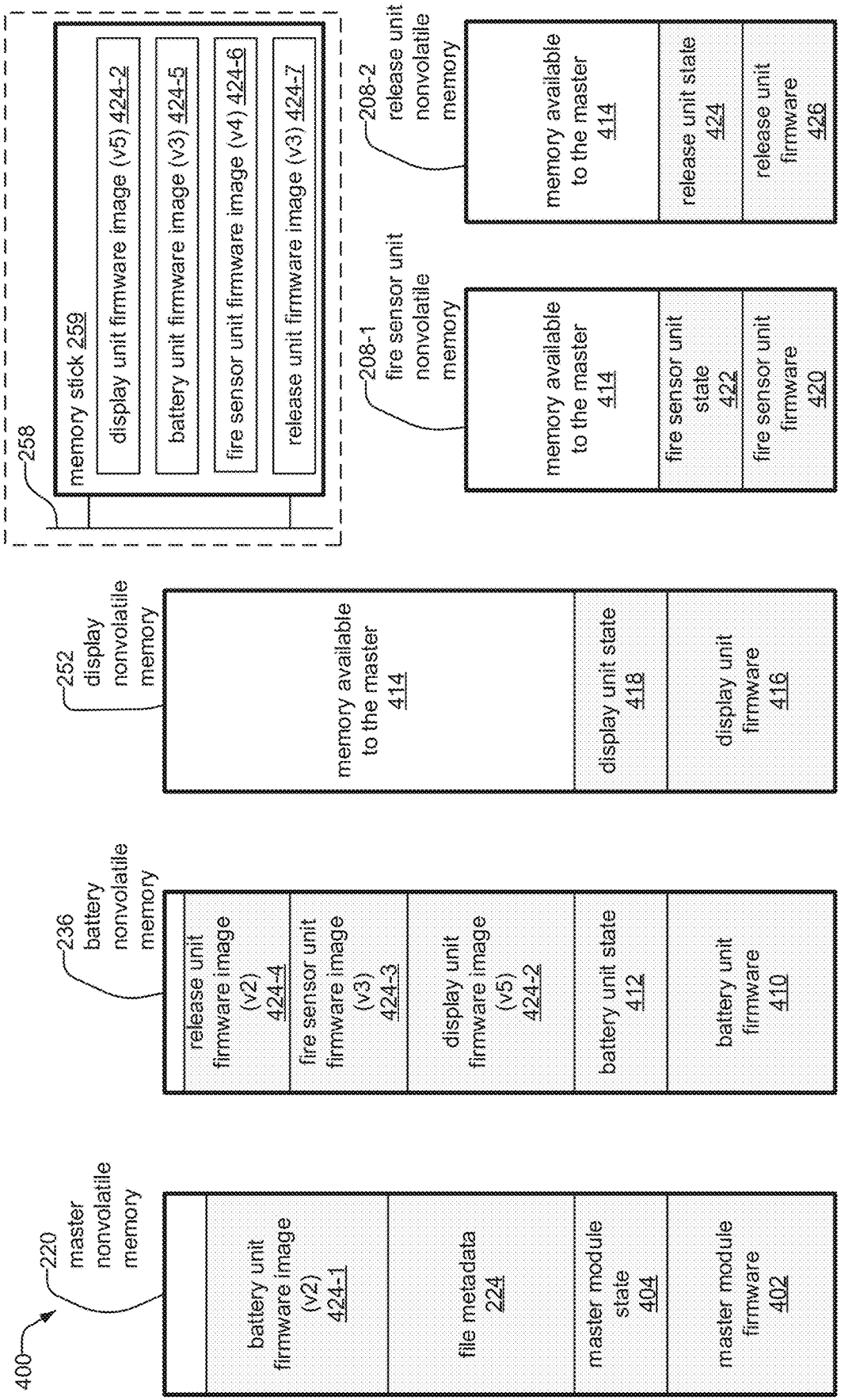
FIG. 4 shows the distributed file system 400 as a series of memory maps for each of the master module and several slave units along with new files on a memory stick plugged into the fire system.

Illustrating this example, FIG. 4 shows the distributed file system 400 as a series of memory maps for each of the master module and several slave units, each of which includes firmware 402, 410, 416, 420, 426 and data associated with maintaining state for that specific module 404, 412, 418, 422, 424.

In order to illustrate the operation of the system, an example is shown where the system has already stored backup copies of firmware for its slave units. Specifically, the master nonvolatile memory 220 stores file metadata 224 and a battery unit firmware image (v2) 424-1, which is a backup copy of version two of the firmware for the battery unit 106-2. The battery nonvolatile memory 236 also stores a display unit firmware image (v5) 424-2, a fire sensor unit firmware image (v3) 424-3, and a release unit firmware image (v2) 424-4.

Also shown is a memory stick 259 plugged into the USB port 258 of the display unit 106-1, The memory stick 259, or alternatively a portable computer, stores the new files, which include the display unit firmware image (v5) 424-2, a battery unit firmware image (v3) 424-5, a fire sensor unit firmware image (v4) 424-6, and a release unit firmware image (v3) 424-7. Finally the display nonvolatile memory 252, fire sensor unit nonvolatile memory 208-1 and release unit nonvolatile memory 208-2 all have memory available to the master 414, which is memory that is unused by the slave unit and designated by the master module 102 as available in the file metadata 224.

In this way, the system 100 implements a distributed file system. The master module stores files or parts of files in unused memory among the various slave units and keeps track of the locations of those files using the file metadata 224.

FIG. 5 is a schematic diagram showing the file metadata 224 stored in the master nonvolatile memory 220. The file metadata 224 includes a file index 260 and a device index 262. The file index 260 shows the various stored files, their version, location among the various units, start address in the memory of the unit on which it is stored, size, and checksum, which is a calculated value based on the data of the file used to verify the file's integrity. The device index 262 lists the various units in the system, their total memory and available memory. For example, the battery unit firmware image (v2) 424-1 is listed in the file index 260 with its type as "battery", its version as "2", its location as "master" (indicating the file is stored on the master nonvolatile memory 220), its start address as "address1", its size as "120 KB", and its checksum as "checksum1". In another example, the display unit 106-1 is listed in the device index 262 as having 512 KB total memory and 174 KB of free memory, indicating that 174 KB of the display nonvolatile memory 252 is memory available to the master 414.

Returning to FIG. 3, in step 304, the metadata 224 is accessed, and the versions of the new files are compared to the versions of the corresponding files previously stored by the master on the distributed file system 400. In step 306, it is determined whether the versions of the new files are more recent than the versions of the files previously stored by the master.

If the versions of the new files are not more recent than the versions of the corresponding files previously stored by the master, the new files are ignored in step 308. For example, the display unit firmware image (v5) 424-2 stored on the memory stick 259 is version five of the display unit firmware, which is the same version listed for the display unit firmware in the file index 260. As a result, the display unit firmware image (v5) 424-2 stored on the memory stick 259 is ignored.

On the other hand, if the versions of the new files are more recent than the versions of the corresponding files previously stored by the master, if there is no corresponding stored version, or if the corresponding stored version is corrupt, then it is determined in step 310 whether there is adequate available memory in the master nonvolatile memory 220 to store the new files. If it is determined that there is adequate memory in the master nonvolatile memory 220 to store the new files, the new files are stored locally in step 312. If there is not adequate available memory, in step 314 the file metadata 224 is accessed to identify a target slave unit with memory available to the master 414. In one embodiment, if the file being stored is firmware, a target slave is selected that is of a different type than the firmware being stored. In this way, if a slave unit is destroyed and is later replaced with a new slave unit, the system will have firmware to load onto that new slave unit.

For example, the battery unit firmware image (v3) 424-5 stored on the memory stick 259 is version three of the battery unit firmware, which is newer than version two, the version listed for the battery unit firmware in the file index 260. Similarly, the fire sensor unit firmware image (v4) 424-6 and the release unit firmware image (v3) 424-7 stored on the memory stick 259 are more recent than the corresponding versions listed in the file index 260. As a result, it is determined that the battery unit firmware image (v3) 424-5, fire sensor unit firmware image (v4) 424-6 and release unit firmware image (v3) 424-7 will all be stored on the distributed file system 400 as part of this update process. The device index 262 is then accessed, and it is determined that there is only 24 KB available on the master nonvolatile memory 220, which is insufficient to store the display unit firmware image (v6) 424-5. The device index 262 is then accessed again, and it is determined that the display nonvolatile memory 252 has 174 KB of memory available to the master 414, which is sufficient to store the display unit firmware image (v6) 424-5. The display unit is also of a different type than the first new file (the battery unit firmware image 424-5). Therefore, the display unit 106-1 is identified as the target slave on which the first new file will be stored.

Figure 6:
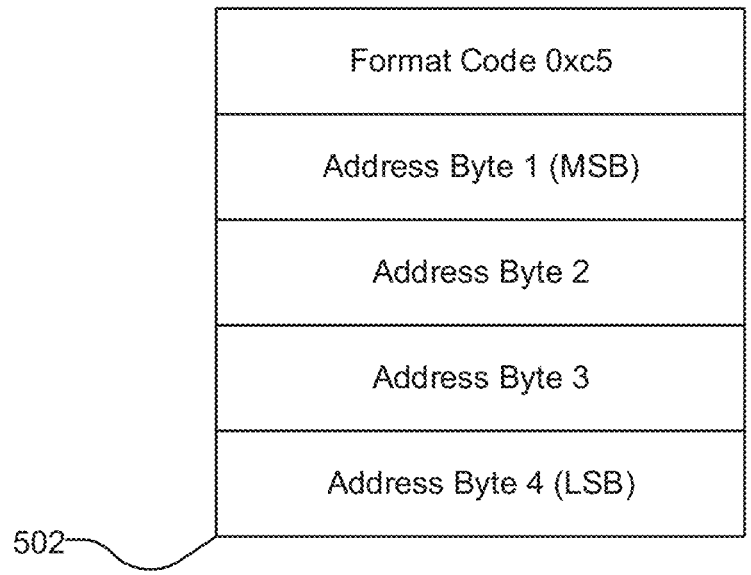
FIG. 6 illustrates the download control instruction.
Figure 7:
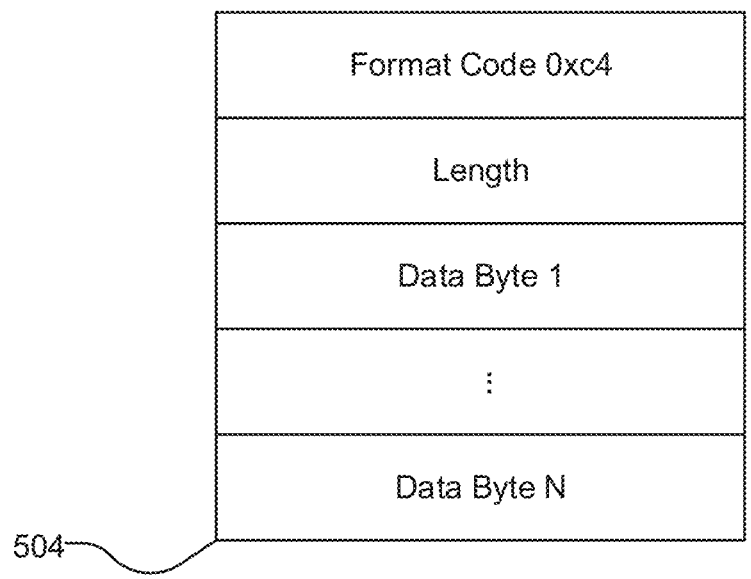
FIG. 7 illustrates the download data instruction.

The new files are downloaded to the target slave using a series of instructions sent from the master module 102 to the target slave. FIG. 6 illustrates the download control instruction 502, which includes a header with a format code, which is a unique code specifying the instruction given, and the four bytes of the address. FIG. 7 illustrates the download data instruction 504, which includes a header with a format code, the length of the file, and a variable number of bytes of the new file's data.

Returning to FIG. 3, in step 316, the master module sends the download control instruction 502 with the start address to the target slave. In step 318, the master module sends the download data instruction 504 to the target slave with the length and data of the file. The data is stored at the address indicated by the download control instruction 502. In step 320, the file metadata 224 is then updated with the newly stored files, including the file types, versions, locations, start addresses, sizes and checksum values.

Figure 8:
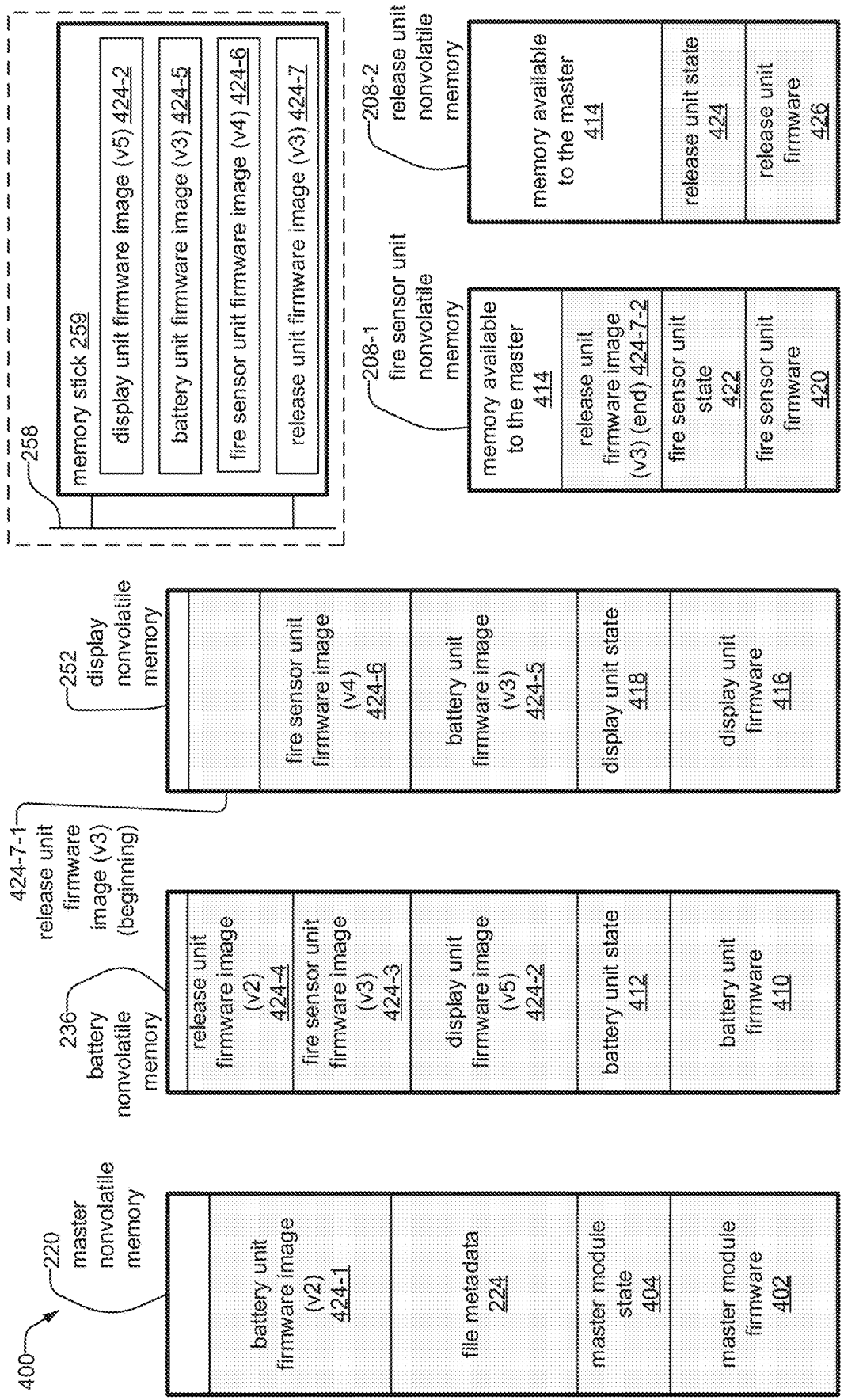
FIG. 8 shows the distributed file system of FIG. 4 after new files have been stored.

FIG. 8 shows the distributed file system 400 after the new files have been stored. The display nonvolatile memory 252 now stores three additional files: the battery unit firmware image (v3) 424-5, the fire sensor unit firmware image (v4) 424-6, and the beginning of the release unit firmware image (v3) 424-7-1. The end of the release unit firmware image (v3) 424-7-2 is now stored on the fire sensor unit nonvolatile memory 208-1.

FIG. 9 shows the file metadata 224 after the new files have been stored.

The new files are listed in the file index 260. For example, the battery unit firmware image (v3) 424-5 is listed in the file index 260 with its type as "battery", its version as "3", its location as "display", its start address as "address5", its size as "120 KB", and its checksum as "checksum5". In another example, the release unit firmware image (v3) 424-7 is listed in the file index 260 with its type as "release", its version as "3", its location as both "display" and "fire sensor", its address as both "address7" and "address8", its size as both "12 KB" and "20 KB", and its checksum as both "checksum7" and "checksum8", indicating that the first 12. KB of the file is located on the display nonvolatile memory 252 at address7, with a checksum of checksum7, and the remaining 20 KB of the file is located on the fire sensor unit nonvolatile memory 208-1 at address8 with a checksum of checksum8.

The device index 262 is also updated. In particular, the free memory for the display and the fire sensor, the two units on which the new files are stored, is now reduced to indicate that there is less memory available to the master 414 as a result of the new files being stored.

Returning to FIG. 3, in step 322, the older versions corresponding to the new files are located, and in step 324, the older versions are deleted. In step 326, the metadata 224 is updated to remove the information for the files that were deleted.

Files are erased from the distributed file system using a series of instructions sent between the master module 102 and the target slave.

FIG. 10 illustrates the erase page instruction 506, which includes a header with a format code, the four bytes of the page address, which is the address of the page to erase in the slave nonvolatile memory 208, and four page erase mask bytes, which represent the quarter rows of memory to erase. In the current embodiment, the nonvolatile memory 220, 208, 236, 252 is flash memory, which is writeable by bytes, rows and pages, but erasable only by page. Because files can overlap a page boundary, it is necessary for the master module 102 to communicate to the target slave which rows to keep and which to delete. When erasing files, the master module 102 loops through the addresses covered by the flash page of each slave.

FIG. 11 illustrates the filesystem task return packet 508, which includes a header with a format code, and a code representing any potential errors that may have occurred during the erase process. If an error has occurred, the section of memory is marked as used and will not be freed up for future use by the master module 102.

Figure 12:
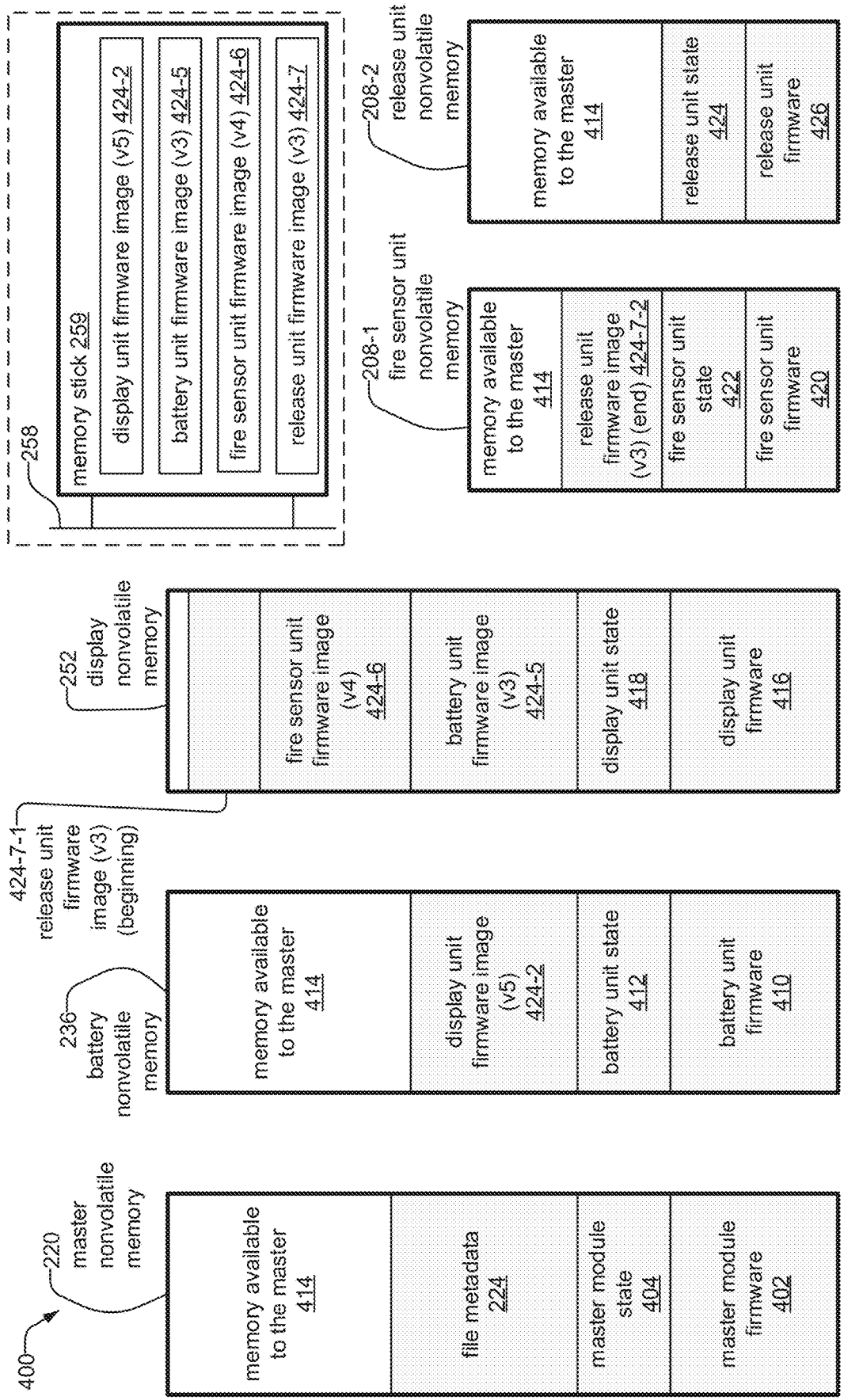
FIG. 12 shows the distributed file system of FIG. 8 after older versions corresponding to newly stored files are deleted.

FIG. 12 shows the distributed file system 400 after the older versions corresponding to the new files are deleted. The master nonvolatile memory 220 and the battery nonvolatile memory 236 now have memory available to the master 414 in place of the deleted older versions.

FIG. 13 shows the file metadata 224 after the older versions corresponding to the new files are deleted. The file index 260 no longer lists the older versions. In the device index 262, free memory for the master and the battery, the units from which the older versions were deleted, is now increased to indicate that there is more memory available to the master 414 as a result of the older versions being deleted.

In this way, the system 100 writes files to a distributed file system. The master module targets a slave unit with memory available to the master 414, stores the file on the target slave unit's nonvolatile memory, and then updates the file metadata 224 with information about the location, size, and checksum of the stored files.

Figure 14:
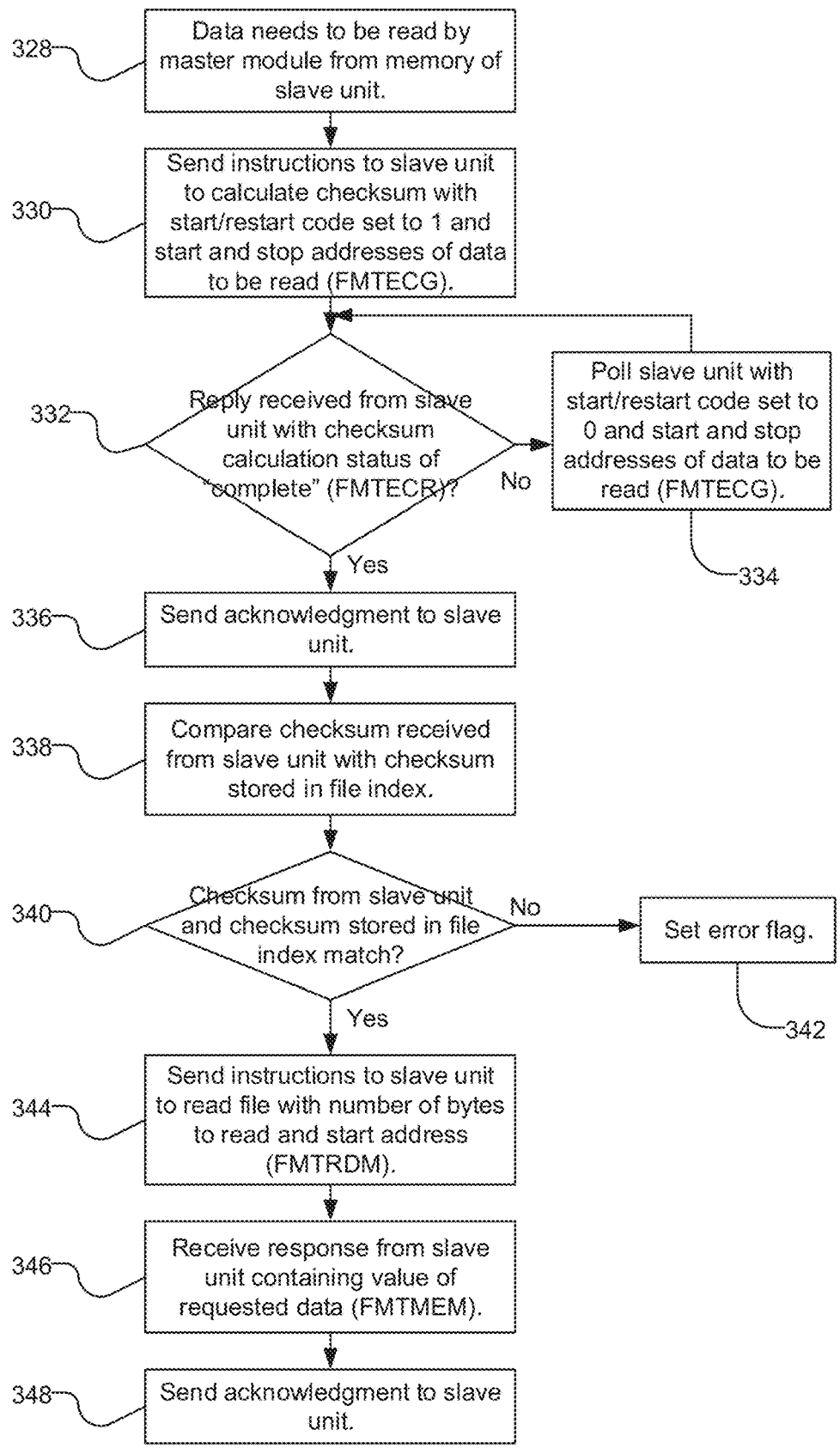
FIG. 14 is a flow diagram showing the method for reading of files in the distributed file system by the master module.

FIG. 14 is a flow diagram showing the reading of files in the distributed file system 400 by the master module 102. In step 328, it is determined that data located on the nonvolatile memory of a target slave needs to be read by the master module 102.

Files are read in the distributed file system 400 using a series of instructions sent from the master module 102 to the target slave.

FIG. 15 illustrates the external checksum get instruction 510, which is sent by the master module 102 to the target slave in order to verify the data before it is read. The external checksum get instruction 510 includes a header with a format code, a restart/start code, which is a value indicating whether the target slave should start or restart computation of the checksum, the four start page address bytes of the file to be verified, and the four stop page address bytes.

FIG. 16 illustrates the external checksum reply packet 512, which is sent by the target slave to the master module 102 in response to the external checksum get instruction 510. The external checksum reply packet 512 includes a header with a format code, a checksum calculation status, which is a value corresponding to a number of possible statuses for the checksum calculation process (including idle, in progress, complete and error), and four bytes containing the calculated checksum.

FIG. 17 illustrates the read slave memory location instruction 514, which is sent by the master module 102 to the target slave. The read slave memory location instruction 514 includes a header with a format code, the high byte of the most significant word of the start address, the low byte of the most significant word of the start address, the high byte of the least significant word of the start address, the low byte of the least significant word of the start address, and the number of bytes to read. FIG. 18 illustrates the memory data response packet 516, which is sent from the target slave to the master module 102 in response to the read slave memory location instruction 514. The memory data response packet 516 includes a header with a format code, the number of bytes of data included, and the data starting at the start address indicated in the read slave memory location instruction 514 and ending after the number of bytes indicated in the read slave memory location instruction 514 is included.

Returning to FIG. 14, the master module 102 sends the external checksum get instruction 510 to the target slave with a restart/start code of 1 (indicating that the calculation of the checksum should be started) and the start and stop address of the data to be verified in step 330. In step 332 it is determined whether an external checksum reply packet 512 is received from the target slave indicating a checksum calculation status of "complete". If no reply is received, or if a reply is received with a checksum calculation status other than "complete" (such as "in progress"), in step 334, the master module 102 proceeds to poll the target slave with one or more additional external checksum get instructions 510 with a restart/start code of 0 (indicating that the calculation of the checksum should not be restarted) until the target slave returns a checksum calculation status of "complete".

When an external checksum reply packet 512 is received from the target slave indicating a checksum calculation status of "complete", an acknowledgment is sent from the master module 102 to the target slave in step 336. Then, in step 338, the checksum received from the target slave is compared with checksum stored in the file index 260 for the corresponding file. In step 340, it is determined whether the checksum values match. If not, the data is determined to be corrupted.

If the checksum values match, in step 344, the master module 102 sends the read slave memory location instruction 514 to the target slave with the number of bytes to read and the start address. In step 346, the master module 102 receives a response from the target slave containing the number of bytes read and the value of the requested data. In step 348, an acknowledgment is then sent back to the target slave when the data is read by the master module 102.

In one example, it is determined that the display unit firmware (v5) 424-2 needs to be read. According to the file index 260, the display unit firmware (v5) 424-2 is 120 KB with a start address of "address2" and checksum of "checksum2", located on the battery nonvolatile memory 236.

The master module 102 sends the external checksum get instruction 510 to the battery unit 106-2 with a format code of "0x7F", a restart/start code of 1, and a start and stop address corresponding to "address2". The battery unit 106-2 then sends the external checksum reply packet 512 to the master module 102 with a format code of "0x7E", a checksum calculation status of "complete", and the calculated checksum. The calculated checksum is compared to "checksum2", and it is determined that the values are the same and thus the file to be read is not corrupted. The master module 102 sends an acknowledgment to the battery unit 106-2.

The master module 102 then sends the read slave memory location instruction 514 to the battery unit 106-2 with the format code "0xc1", the size of 120000, and the high and low bytes of the most significant word, and the high and low bytes of the least significant word, of the start address corresponding to address5. The battery unit 106-2 receives the read slave memory location instruction 514 and responds by sending a memory data response packet 516 to the master module 102 with the format code "0xc3", the number of bytes read, and the value of the display unit firmware (v5) 424-2 file. The master module 102 then sends an acknowledgment to the battery unit 106-2 that the file was read.

In this way, the system 100 reads files from a distributed file system. The master module verifies the integrity of data stored on a target slave unit and then instructs the target slave to return the value of the file stored in its memory by the master module 102.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for storing files in a fire system, the fire system being one of a fire detection system, a fire suppression system, or a combination fire detection and suppression system, the method comprising:
   determining, by a master module, available memory on slave units of the fire system, wherein the slave units perform tasks related to fire detection or fire suppression;
   instructing the slave units, by the master module, to store new files to the available memory; and
   reading, by the master module, the files stored to the slave units,
   wherein the available memory on the slave units is memory that is unused by the slave units and is designated by the master module as available in file metadata, and the master module uses the available memory on the slave units as a distributed file system to store images of firmware for each type of slave unit installed on the system, and the master module stores firmware images for one type of slave unit to the available memory of slave units of a different type than the one type of slave unit.

2. The method as claimed in claim 1, wherein the master module determines the available memory by accessing metadata specifying available memory in the slave units.

3. The method as claimed in claim 1, further comprising comparing, by the master module, versions of the new files to versions of files previously stored by the master module and only storing the new files if the version of the new files are more recent than the versions of the files previously stored.

4. The method as claimed in claim 1, further comprising updating, by the master module, metadata identifying the slave units on which the new files are stored.

5. The method as claimed in claim 1, further comprising deleting, by the master module, older versions corresponding to the new files that were previously stored by the master module.

6. The method as claimed in claim 1, wherein the master module stores file verification information that is used to verify the integrity of the files stored on the slave units.

7. The method as claimed in claim 6, wherein the master module file verification information is checksum information.

8. The method as claimed in claim 1, wherein each of the slave units includes nonvolatile memory which contains the available memory, a controller for executing firmware instructions stored in the nonvolatile memory, and transceivers for communicating with the master module on a common bus.

9. The method as claimed in claim 8, wherein each of the slave units further comprises a slave element for performing tasks of the fire system related to fire detection, notification, and/or suppression.

10. The method as claimed in claim 9, wherein the slave units receive instructions from the master module and send information to the master module via the transceivers and the common bus based on the slave elements of the slave units.

11. The method as claimed in claim 10, wherein the information sent from the slave units to the master module includes information about an environment detected by the slave units via the slave elements, including heat, infrared radiation, and/or presence of fire, and the instructions received from the slave units from the master module includes instructions to perform a fire suppression function and/or display an alert via the slave elements.

12. The method as claimed in claim 11, wherein the slave units include a power supply for the fire system, and the master module stores the new files to available memory of the power supply and reads the files stored to the power supply.

13. The method as claimed in claim 12, wherein the files stored to the available memory of the power supply and read from the power supply include firmware images of firmware for the slave units.

14. The method as claimed in claim 13, wherein the firmware images stored to the available memory of the power supply includes firmware images for slave units of different types than the power supply.

15. The method as claimed in claim 8, wherein the master module uses a common address space to communicate with the slave units via the common bus.

16. The method as claimed in claim 1, wherein the slave units include a power supply for the fire system, and the master module stores the new files to available memory of the power supply and reads the files stored to the power supply.

17. The method as claimed in claim 1, wherein the images of the firmware for each type of slave unit are used to update the firmware of the slave units if their current firmware is corrupted or outdated, or if a new slave unit is installed.

18. A system for storing files in a fire system, the fire system being one of a fire detection system, a fire suppression system, or a combination fire detection and suppression system, the system comprising:
  slave units of the fire system for performing tasks related to fire detection or fire suppression;
  a master module determining available memory on the slave units, storing new files to the available memory, and reading the files stored to the slave units,
  wherein the available memory on the slave units is memory that is unused by the slave units and is designated by the master module as available in file metadata, and the master module uses the available memory on the slave units as a distributed file system to store images of firmware for each type of slave unit installed on the system, and the master module stores firmware images for one type of slave unit to the available memory of slave units of a different type than the one type of slave unit.

19. The system as claimed in claim 18, wherein the master module determines the available memory by accessing metadata specifying available memory in the slave units.

20. The system as claimed in claim 18, wherein the master module compares versions of the new files to versions of files previously stored by the master module and only stores the new files if the version of the new files are more recent than the versions of the files previously stored.

21. The system as claimed in claim 18, wherein the master module updates metadata identifying the slave units on which the new files are stored.

22. The system as claimed in claim 18, wherein the master module deletes older versions corresponding to the new files that were previously stored by the master module.

23. The system as claimed in claim 18, wherein the master module stores file verification information that is used to verify the integrity of the files stored on the slave units.

24. The system as claimed in claim 23, wherein the master module file verification information is checksum information.

* * * * *